US011435801B1

(12) United States Patent
Rathinasamy et al.

(10) Patent No.: US 11,435,801 B1
(45) Date of Patent: Sep. 6, 2022

(54) POWERING CO-PACKAGED NETWORKING SYSTEM

(71) Applicant: Dell Products L.P., Round Rock, TX (US)

(72) Inventors: Shree Rathinasamy, Round Rock, TX (US); Neal Beard, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/203,930

(22) Filed: Mar. 17, 2021

(51) Int. Cl.
*G06F 1/26* (2006.01)
*G05B 15/02* (2006.01)

(52) U.S. Cl.
CPC .............. *G06F 1/266* (2013.01); *G05B 15/02* (2013.01)

(58) Field of Classification Search
CPC .................................. G06F 1/266; G05B 15/02
See application file for complete search history.

(56) References Cited

U.S. PATENT DOCUMENTS

| 8,358,893 | B1 * | 1/2013 | Sanderson | ........... G02B 6/4415 385/115 |
| 2005/0226625 | A1 * | 10/2005 | Wake | ............... H04B 10/25753 398/115 |
| 2014/0258742 | A1 * | 9/2014 | Chien | ..................... H04L 12/10 713/300 |
| 2019/0089467 | A1 * | 3/2019 | Goergen | ........... H04L 12/40091 |
| 2019/0304630 | A1 * | 10/2019 | Goergen | ................ H01B 9/003 |

OTHER PUBLICATIONS

"Intel Demonstrates Industry-First Co-Packaged Optics Ethernet Switch," Intel, News Byte, Mar. 5, 2020, 2 Pages, Retrieved Mar. 16, 2021 from https://newsroom.intel.com/news/intel-demonstrates-industry-first-co-packaged-optics-ethernet-switch/#gs.expred.
Ubiquiti Networks, "FiberPoE GEN2 Optical Data Transport for Outdoor PoE Devices Model: F-POE-G2 Quick Start Guide," 28 Pages, Available at: https://www.ubnt.com/accessories/fiber-poe-accessory/.
Ubiquiti Networks "FiberPoE GEN2 Optical Data Transport for Outdoor PoE Devices Model: F-POE-G2 Datasheet," 6 Pages, Available at: https://www.ubnt.com/accessories/fiber-poe-accessory/.
CABLING Installation & Maintenance, "Composite copper/fiber cable: not just any mix of cable," Mar. 1, 2002, 6 Pages, Retrieved Mar. 16, 2021 from https://www.cablinginstall.com/articles/print/volume-10/issue-3/products-services/product-update/composite-copper-fiber-cable-not-just-any-mix-of-cable.html.

* cited by examiner

*Primary Examiner* — Gary Collins
(74) *Attorney, Agent, or Firm* — Joseph Mencher

(57) ABSTRACT

A powering co-packaged networking system includes a powering co-packaged networking device coupled via a power/data cable to a powered device. The powering co-packaged networking device includes a connector subsystem coupled to a power controller device and an optical/electrical signal conversion processing system that converts between optical signals and electrical signals. The connector subsystem is connected to the powered device via a power/data connector on the power/data cable, and includes an optical signal sub-connector that receives optical signals from the optical/electrical signal conversion processing system and transmits the optical signals via the power/data connector on the power/data cable and through the power/data cable to the powered device, and a power sub-connector that receives power from the power controller device and transmits the power via the power/data connector on the power/data cable and through the power/data cable to the powered device.

20 Claims, 18 Drawing Sheets

POWERING CO-PACKAGED NETWORKING SYSTEM

BACKGROUND

The present disclosure relates generally to information handling systems, and more particularly to providing power along with data via a co-packaged networking information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices and/or other networking devices known in art, are sometimes configured to utilize optical signals in order to, for example, increase the speed of data transmissions and/or provide other benefits known in the art. For example, some conventional switch devices are configured to process electrical signals, and utilize transceiver devices that are connected to ports on the switch device and that operate to receive optical signals from a connected fiber optic cable and convert those optical signals to electrical signals that are then provided to the switch device for processing, as well as receive electrical signals from the switch device and convert those electrical signals to optical signals before transmitting those optical signals via the connected fiber optic cable. However, the transceiver devices and associated subsystems discussed above are relatively expensive, can reduce data signal integrity, and/or are subject to other issues known in the art.

In order to address the issues associated with the transceiver devices discussed above, "co-packaged" switch devices have been developed that include an optical/electrical signal conversion processing system (e.g., a Network Processing Unit (NPU), an Application Specific Integrated Circuit (ASIC), etc.) that is configured to convert between electrical signals and optical signals within the switch device, thus allowing for fiber optic cables to be directly connected to ports on the switch device, eliminating the need for the transceiver devices discussed above, improving signal integrity, and providing other benefits known in the art. However, the utilization of the fiber optic cables discussed above prevents co-packaged switch devices from providing power along with data (e.g., as is done with Power over Ethernet (PoE) switch devices via conventional conductive cabling that can transmit electrical signals along with power), thus increasing the amount of cabling (e.g., separate fiber optic cabling and power cabling for each powered device) that is required in networked systems that utilize co-packaged switch devices.

Accordingly, it would be desirable to provide a co-packaged networking device that addresses the issues discussed above.

SUMMARY

According to one embodiment, an Information Handling System (IHS) includes a power controller device; an optical/electrical signal conversion processing system that is configured to convert between optical signals and electrical signals; and a connector subsystem that is coupled to the optical/electrical signal conversion processing system and the power controller device, wherein the connector subsystem is configured to be connected to a powered device via a power/data connector on a power/data cable and includes: an optical signal sub-connector that is configured to receive first optical signals from the optical/electrical signal conversion processing system and transmit the first optical signals via the power/data connector on the power/data cable and through the power/data cable to the powered device; and a power sub-connector that is configured to receive power from the power controller device and transmit the power via the power/data connector on the power/data cable and through the power/data cable to the powered device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
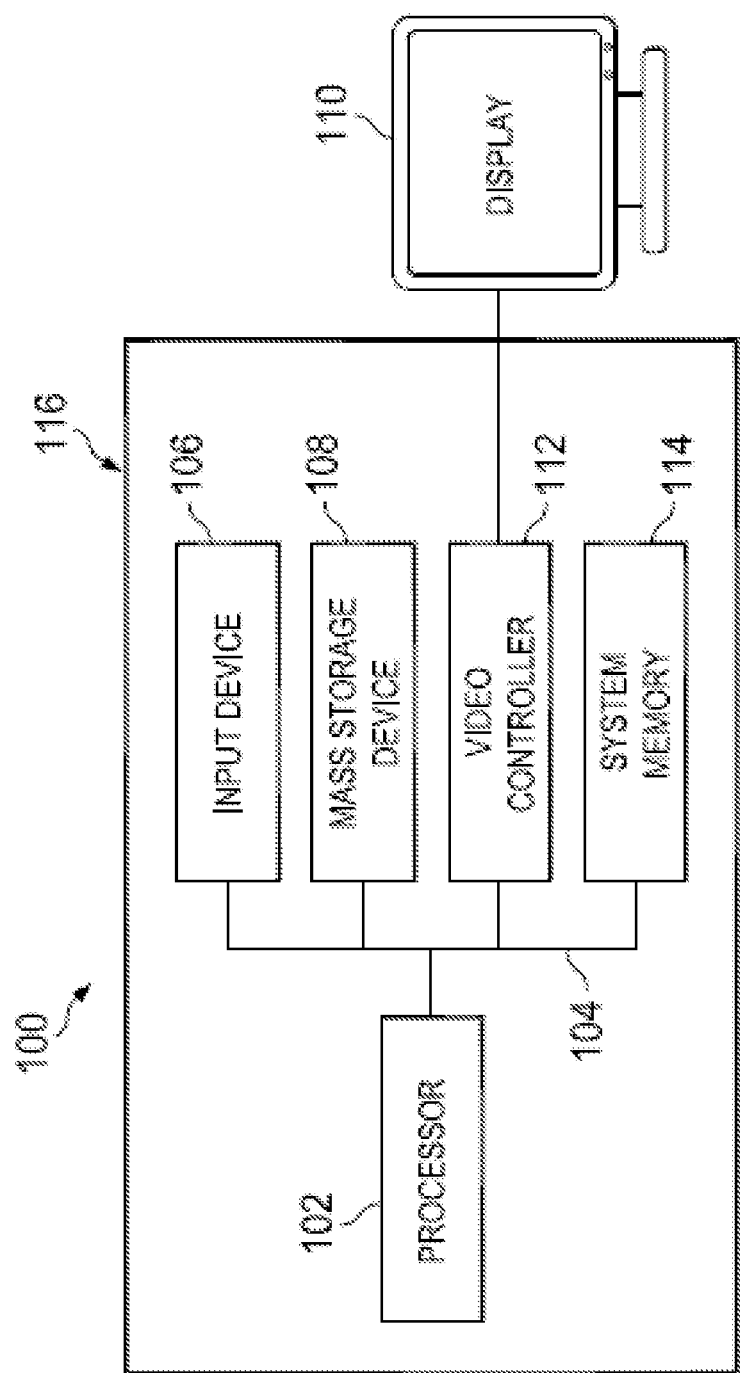
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
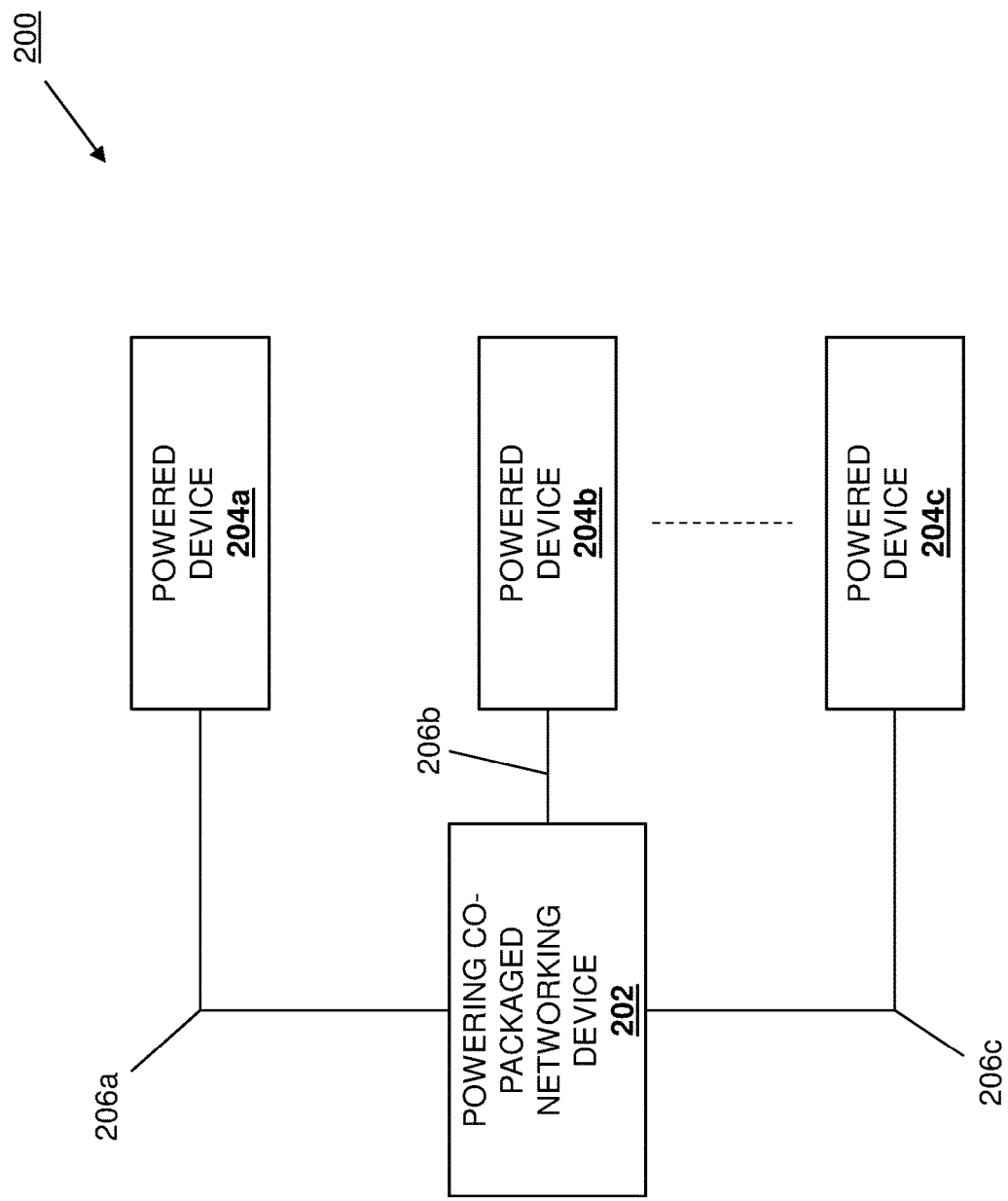
FIG. 2 is a schematic view illustrating an embodiment of a networked system that may utilize the powering co-packaged networking device system of the present disclosure.

Referring now to FIG. 2, an embodiment of a networked system 200 is illustrated. In the illustrated embodiment, the networked system 200 includes a powering co-packaged networking device 202. In an embodiment, the powering co-packaged networking device 202 may be provided by the IHS 100 discussed above with reference to FIG. 1, and/or may include some or all of the components of the IHS 100, and in specific examples may be provided by a co-packaged switch device that, as discussed below, includes a processing system (e.g., a Network Processing Unit (NPU), Application Specific Integrated Circuit (ASIC), etc.) that is configured to perform optical/electrical signals conversions (e.g., via the integration of a silicon photonics engine with a switching subsystem and an optical subsystem in the examples below), with that co-packaged switch device also including the ability to power devices via the same cable and connection subsystems that are utilized to transmit optical signals. However, while illustrated and described as a co-packaged switch device utilizing particular optical/electrical conversion technology, one of skill in the art in possession of the present disclosure will recognize that powering co-packaged networking functionality provided in the networked system 200 may be included in other devices that may be configured to operate similarly as the powering co-packaged networking device 202 discussed below. While not illustrated, one of skill in the art in possession of the present disclosure will recognize that the powering co-packaged networking device 202 may be coupled via a network to any of a variety of other devices while remaining within the scope of the present disclosure as well.

In the illustrated embodiment, a plurality of powered devices 204a, 204b, and up to 204c may be coupled to the powering co-packaged networking device 202 via, for example, respective power/data cables 206a, 206b, and up to 206c, respectively, discussed in further detail below. In an embodiment, the powered devices 204a, 204b, and up to 204c may be provided by the IHS 100 discussed above with reference to FIG. 1, and/or may include some or all of the components of the IHS 100, and in specific examples may be provided by powered networking access point devices, powered camera devices, and/or any other powered devices that would be apparent to one of skill in the art in possession of the present disclosure. However, while a specific networked system 200 has been illustrated and described, one of skill in the art in possession of the present disclosure will recognize that the networked system of the present disclosure may include a variety of components and component configurations while remaining within the scope of the present disclosure as well.

Figure 3A:
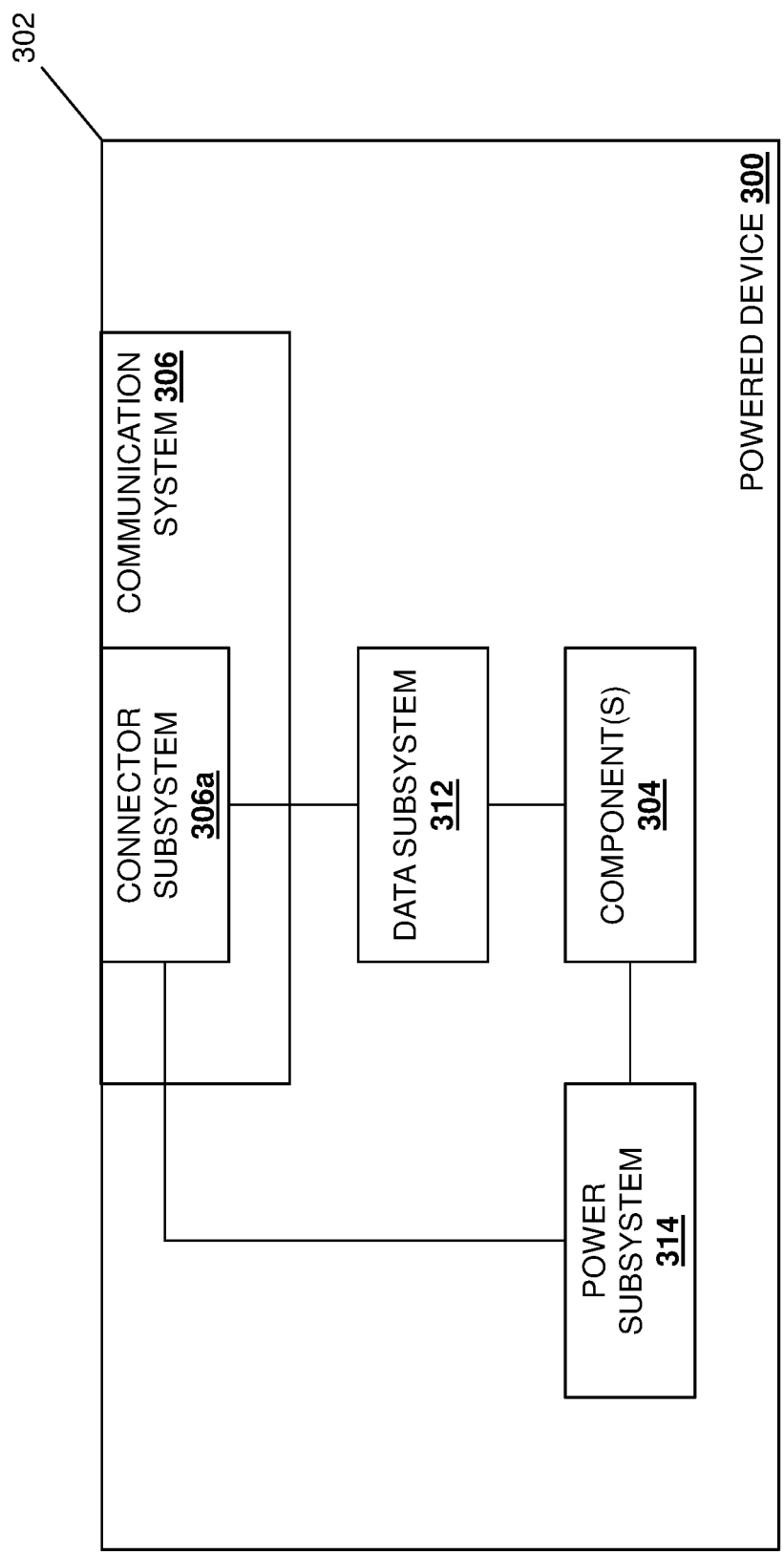
FIG. 3A is a schematic view illustrating an embodiment of a powered device that may be provided in the networked system of FIG. 2.
Figure 3B:
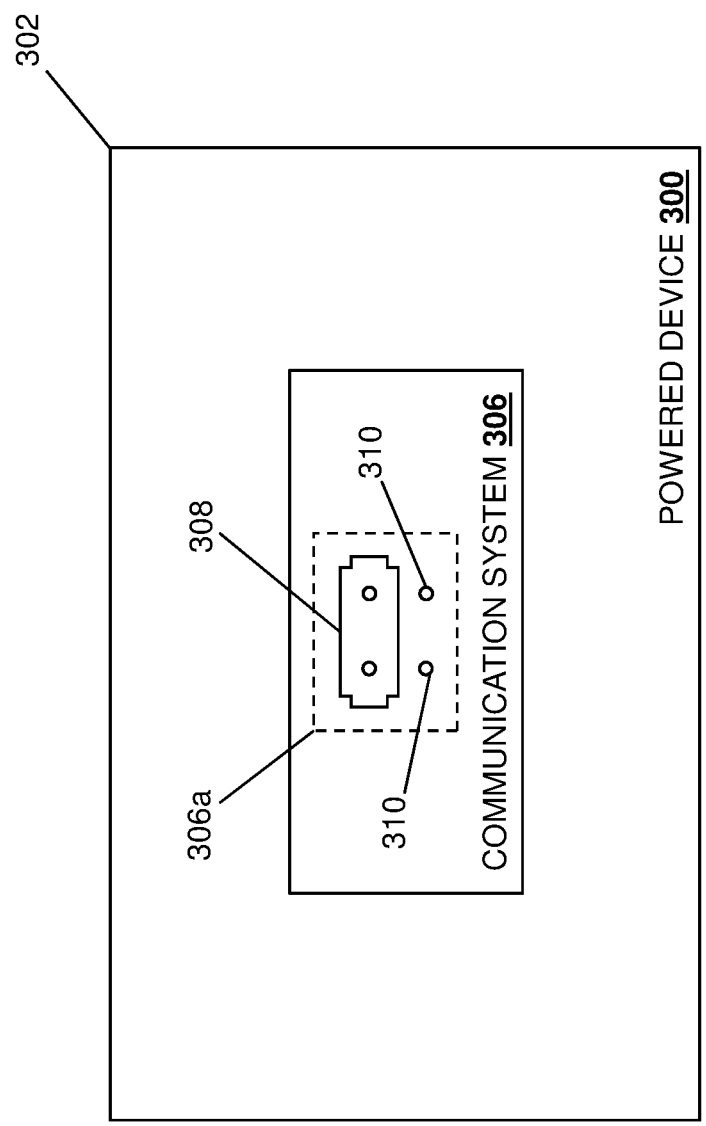
FIG. 3B is a schematic view illustrating an embodiment of the powered device of FIG. 3A.

Referring now to FIGS. 3A and 3B, an embodiment of a powered device 300 is illustrated that may provide any or all of the powered devices 204a, 204b, and up to 204c discussed above with reference to FIG. 2. As such, the powered device 300 may be provided by the IHS 100 discussed above with reference to FIG. 1 and/or may include some or all of the components of the IHS 100, and in specific examples may be provided by powered networking access point devices, powered camera devices, and/or any other powered devices that would be apparent to one of skill in the art in possession of the present disclosure. In the illustrated embodiment, the powered device 300 includes a chassis 302 that houses the components of the powered device 300, only some of which are illustrated below. For example, the chassis 302 may house one or more components 304 that, as discussed in further detail below, may include any of a variety of data utilizing components, power utilizing components, combinations thereof, and/or other components that would be apparent to one of skill in the art in possession of the present disclosure.

The chassis 302 may also house a communication system 306 that is coupled to the to one or more of the component(s) 304 via a data subsystem 312 and a power subsystem 314, and the communication system 306 may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. For example, in the illustrated embodiment, the communication system 306 includes a connector subsystem 306a having a data sub-connector 308 and a power sub-connector 310. While not explicitly illustrated in FIGS. 4A and 4B, one of skill in the art in possession of the present disclosure will appreciate that the connector subsystem 306a may include power/data connector securing features that are configured to secure to a power/data connector on a power/data cable, discussed in further detail below. In the specific examples provided below, the data sub-connector 308 is provided by a Multi-fiber Push-On (MPO) sub-connector, while the power sub-connector 310 is provided by one or more power pins. However, while specific data sub-connectors and power sub-connectors are illustrated and described herein, one of skill in the art in possession of the present disclosure will appreciate that other data connectors and power connectors may be utilized on the powered device 300 while remaining within the scope of the present disclosure as well. Furthermore, while a specific powered device 300 has been illustrated and described, one of skill in the art in possession of the present disclosure will recognize that powered devices (or other devices operating according to the teachings of the present disclosure in a manner similar to that described below for the powered device 300) may include a variety of components and/or component configurations for providing conventional powered device functionality, as well as the functionality discussed below, while remaining within the scope of the present disclosure as well.

Figure 4A:
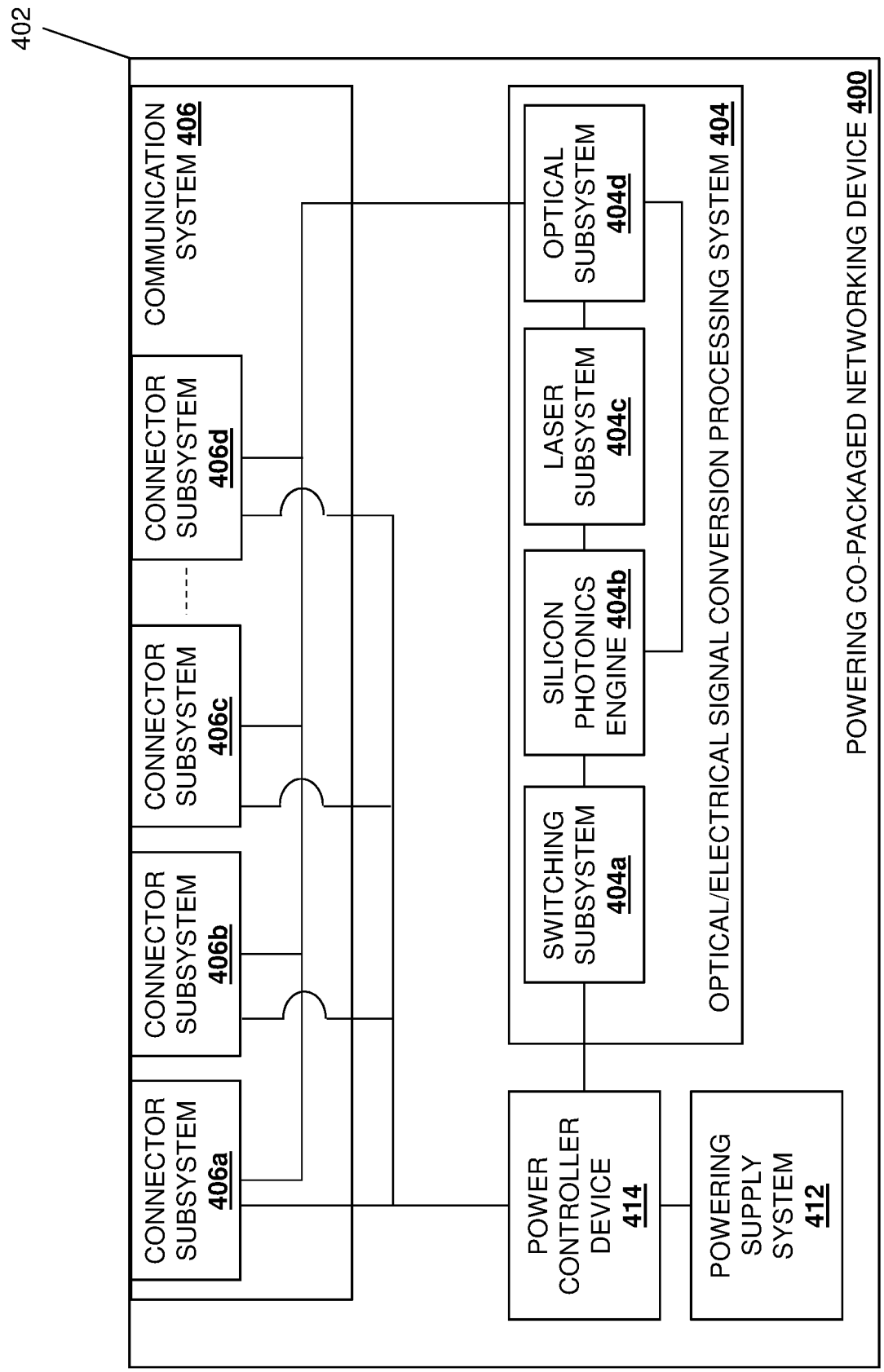
FIG. 4A is a schematic view illustrating an embodiment of a powering co-packaged networking device that is provided according to the teachings of the present disclosure and that may be included in the networked system of FIG. 2.
Figure 4B:
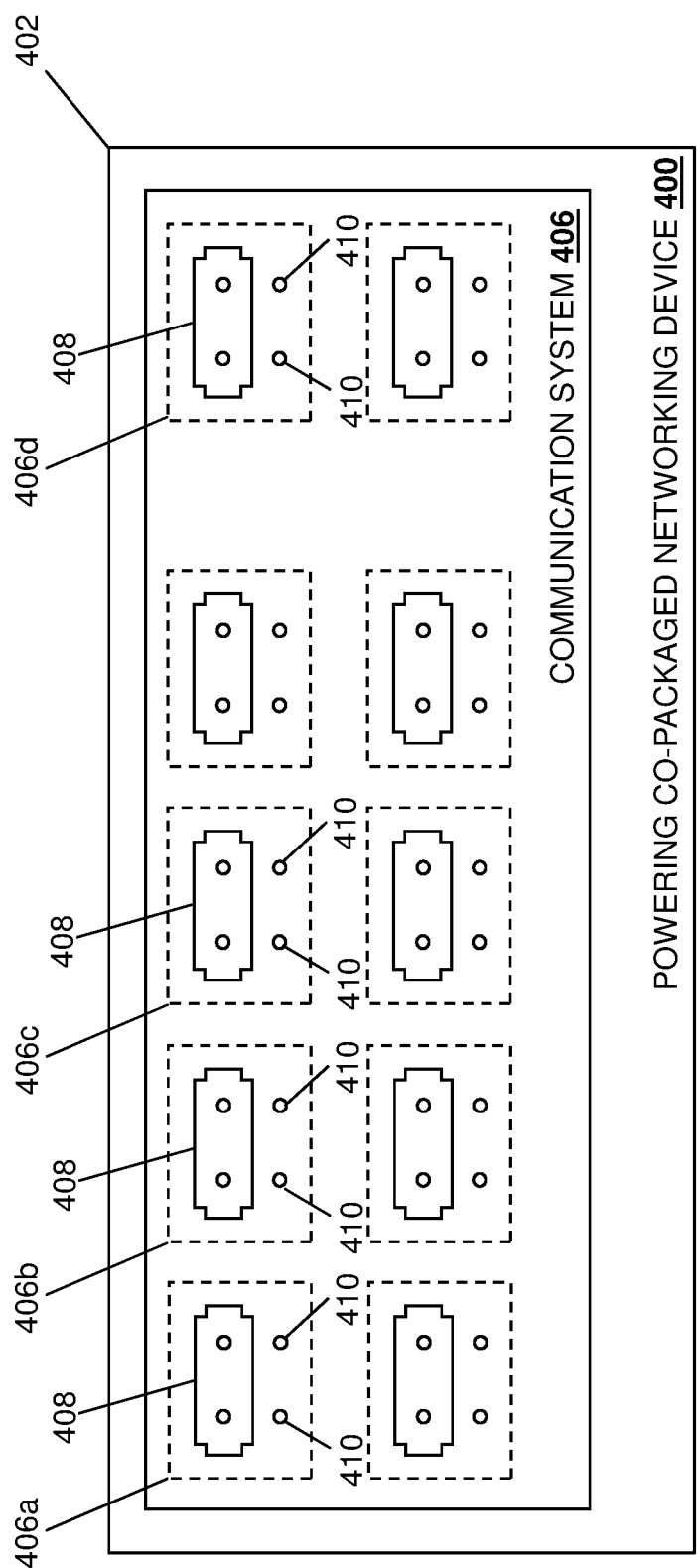
FIG. 4B is a schematic view illustrating an embodiment of the powering co-packaged networking device of FIG. 4A.

Referring now to FIGS. 4A and 4B, an embodiment of a powering co-packaged networking device 400 is illustrated that may provide the powering co-packaged networking device 202 discussed above with reference to FIG. 2. As such, the powering co-packaged networking device 400 may be provided by the IHS 100 discussed above with reference to FIG. 1 and/or may include some or all of the components of the IHS 100, and in specific examples may be provided by powering co-packaged switch device. In the illustrated embodiment, the powered device 300 includes a chassis 302 that houses the components of the powered device 300, only some of which are illustrated below. For example, the chassis 302 may house an optical/electrical signal conversion processing system 404 that is configured to covert between electrical signals and optical signals using engines and/or subsystems that are integrated into the processing system optical/electrical signal conversion processing system 404 (e.g., integrated as part of an NPU, ASIC, or other networking processor(s) included in the powering co-packaged networking device 400).

In the specific example provided herein, the optical/electrical signal conversion processing system 404 includes an integrated switching subsystem 404a that is configured to generate electrical signals (e.g., electrical switching signals), an integrated silicon photonics engine 404b that is coupled to the switching subsystem 404a and that is configured to convert electrical signals generated by the switching subsystem 404b to optical signals and convert received optical signals to electrical signals, an integrated laser subsystem 404c that is coupled to the silicon photonics engine 404b and that is configured to generate optical pulses from optical signals received from the silicon photonics engine 404b, and an integrated optical subsystem 404d that is coupled to both the laser subsystem 404c and the silicon photonics engine 404b and that is configured to transmit the optical pulses provided by the laser subsystem 404c from optical signals converted by the silicon photonics engine 404b out of the optical/electrical signal conversion processing system 404, and provide received optical signals directly to the silicon photonics engine 404b.

Furthermore, one of skill in the art in possession of the present disclosure will appreciate how the switching subsystem 404a may be provided by an Ethernet switch chip and/or other processor that is configured to perform any of a variety of electrical signal/data processing operations known in the art. Further still, one of skill in the art in possession of the present disclosure will appreciate how the silicon photonics engine 404b may include photo-detectors, software, and/or other electrical/optical signal conversion components known in the art. Yet further still, while the laser subsystem 404c and the optical subsystem 404d are illustrated and described as integrated with the optical/electrical signal conversion processing system 404, one of skill in the art in possession of the present disclosure will appreciate that the laser subsystem 404c and the optical subsystem 404d may be external to the optical/electrical signal conversion processing system 404 while remaining within the scope of the present disclosure as well. However, while a specific example of an optical/electrical signal conversion processing system 404 is provided herein, one of skill in the art in possession of the present disclosure will appreciate that other techniques for converting between electrical signals and optical signals in a processing system included in a co-packaged networking device will fall within the scope of the present disclosure as well.

The chassis 402 may also house a communication system 406 that is coupled to the optical/electrical signal conversion processing system 404, and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. For example, in the illustrated embodiment, the communication system 406 includes a plurality of connector subsystems 406a, 406b, 406c, and up to 406d, each having a data sub-connector 408 and a power sub-connector 410, and that are each coupled to the optical subsystem 404d in the optical/electrical signal conversion processing system 404. While not explicitly illustrated in FIGS. 4A and 4B, one of skill in the art in possession of the present disclosure will appreciate that each of the connector subsystems 406a, 406b, 406c, and up to 406d may include power/data connector securing features that are configured to secure to a power/data connector on a power/data cable, discussed in further detail below. In the specific examples provided below, the data sub-connector 408 is provided by a Multi-fiber Push-On (MPO) sub-connector, while the power sub-connector 410 is provided by one or more power pins.

However, while specific data sub-connectors and power sub-connectors are illustrated and described, one of skill in the art in possession of the present disclosure will appreciate that other data connectors and power connectors may be utilized on the powering co-packaged networking device 400 while remaining within the scope of the present disclosure as well.

In the illustrated embodiment, the chassis 402 also houses a powering supply system 412 that may be provided by a Power Supply Unit (PSU) and/or other power components known in the art, and that one of skill in the art in possession of the present disclosure will recognize may be coupled to a power source (not illustrated) such as an Alternating Current (AC) wall outlet and/or other power sources known in the art. A power controller device 414 is coupled to the powering supply system 412, to each of the connector subsystems 406a-406d in the communication system 406, and to the switching subsystem 404a in the optical/electrical signal conversion processing system 404, and is configured to control power received from the powering supply system 412 to the connector subsystems 406a-406d in the communication system 406. While not discussed in detail below, one of skill in the art in possession of the present disclosure will appreciate how the connection between the power controller device 414 and the switching subsystem 404a in the optical/electrical signal conversion processing system 404 may allow the switching subsystem 404a to process data and/or perform other functionality known in the art for the power controller device 414. However, while a specific powering co-packaged networking device 400 has been illustrated and described, one of skill in the art in possession of the present disclosure will recognize that powering co-packaged networking device (or other devices operating according to the teachings of the present disclosure in a manner similar to that described below for the powering co-packaged networking device 400) may include a variety of components and/or component configurations for providing conventional co-packaged networking functionality, as well as the functionality discussed below, while remaining within the scope of the present disclosure as well.

Figure 5A:
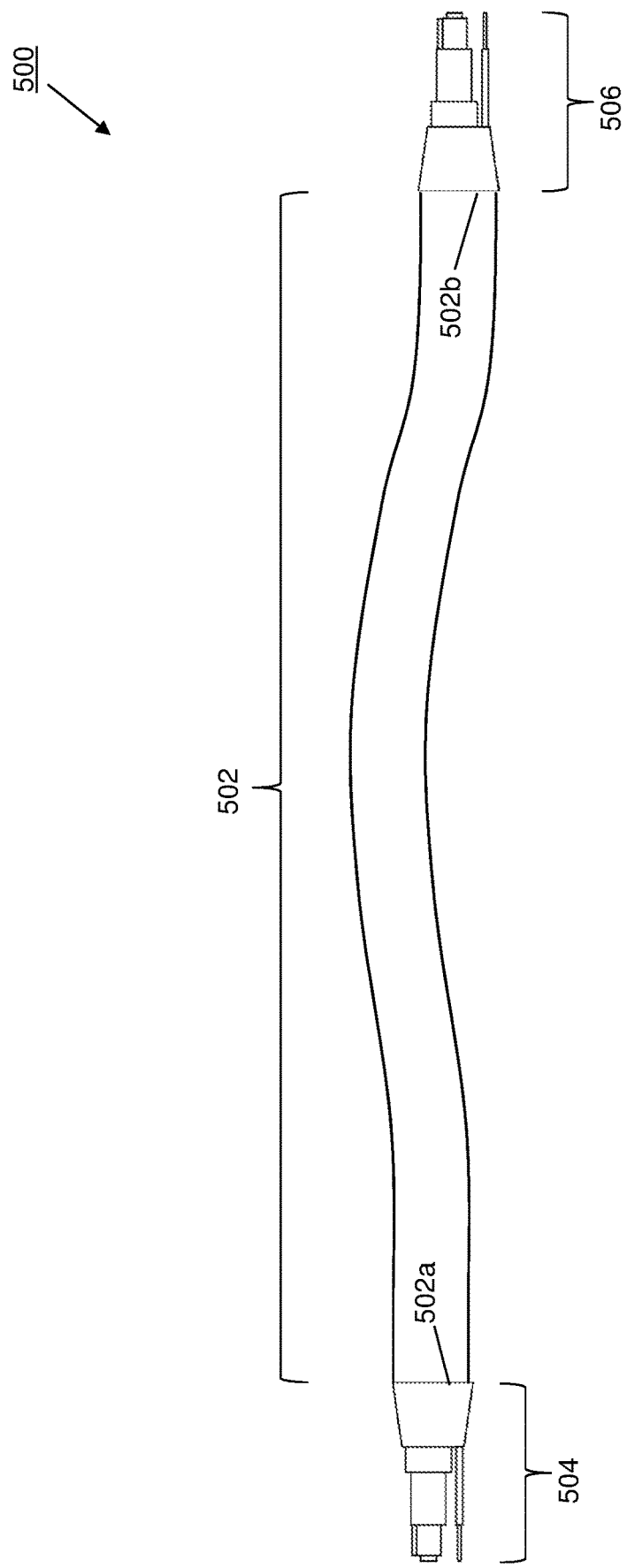
FIG. 5A is a schematic view illustrating an embodiment of a power/data cable that may be provided in the networked system of FIG. 2.
Figure 5B:
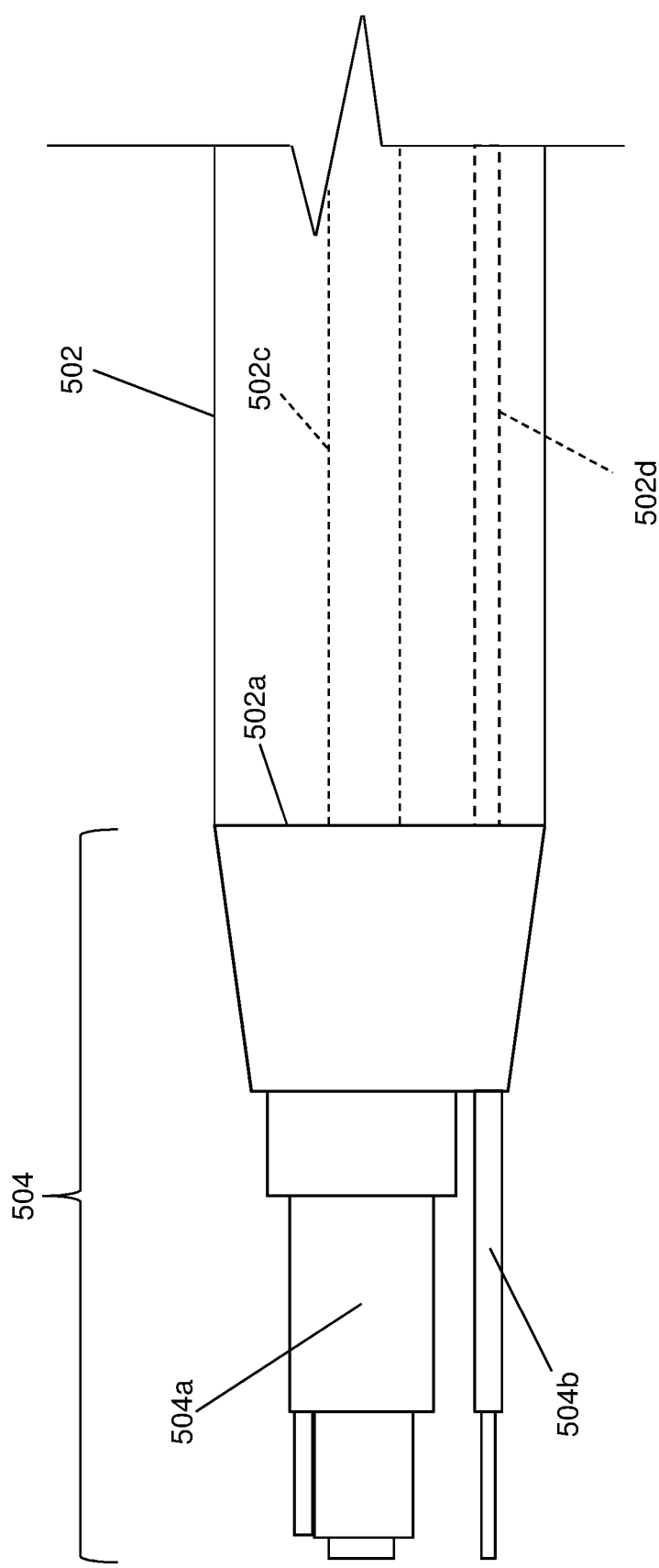
FIG. 5B is a schematic view illustrating an embodiment of the power/data cable of FIG. 5A.
Figure 5C:
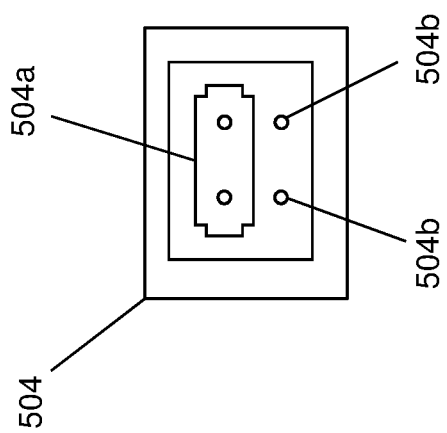
FIG. 5C is a schematic view illustrating an embodiment of the power/data cable of FIGS. 5A and 5B.

Referring now to FIGS. 5A, 5B, and 5C, an embodiment of a power/data cable 500 is illustrated that may provide any or all of the power/data cables 206a-206c of FIG. 2, and thus be utilized to connect any of the powered devices 204a-204c/300 to the powering co-packaged networking device 202/400. In the illustrated embodiment, the power/data cable 500 includes a cabling base 502 having a first end 502a and a second end 502b, and including a fiber optic medium 502c (e.g., one or more fiber optic wires, visible with dashed lines in FIG. 5B) extending through the cabling base 502 from the first end 502a and the second end 502b, and power conductive medium 502d (e.g., copper-based wiring, visible with dashed lines in FIG. 5B) extending through the cabling base 502 from the first end 502a and the second end 502b. A first power/data connector 504 is included on the first end 502a of the cabling base 502 and coupled to each of the fiber optic medium 502c and the power conductive medium 502d in the cabling base 502, and a second power/data connector 506 is included on the second end 502b of the cabling base 502 and coupled to the first power/data connector 504 via each of the fiber optic medium 502c and the power conductive medium 502d in the cabling base 502.

FIGS. 5B and 5C illustrate how the first power/data connector 504 on the power/data cable 500 includes a data sub-connector 504a and a power sub-connector 504b, and one of skill in the art in possession of the present disclosure will appreciate how the second power/data connector 504 may include a substantially similar data sub-connector and power sub-connector as well. In the specific examples provided herein, the data sub-connector 504a is provided by a Multi-fiber Push-On (MPO) sub-connector, while the power sub-connector 504b is provided by one or more power pins (e.g., two power pins in the embodiments illustrated and described herein). While not illustrated, one of skill in the art in possession of the present disclosure will recognize how the first power/data connector 504 and the second power/data connector 506 may also include securing features for securing to connector subsystems on the powered devices 204a-204c/300 and powering co-packaged networking devices 202/400 discussed above. However, while specific power/data cable 500 is illustrated and described, one of skill in the art in possession of the present disclosure will appreciate that the powering co-packaged networking device system of the present disclosure may utilize power/data cables with other components and/or component configurations while remaining within the scope of the present disclosure as well.

Figure 6:
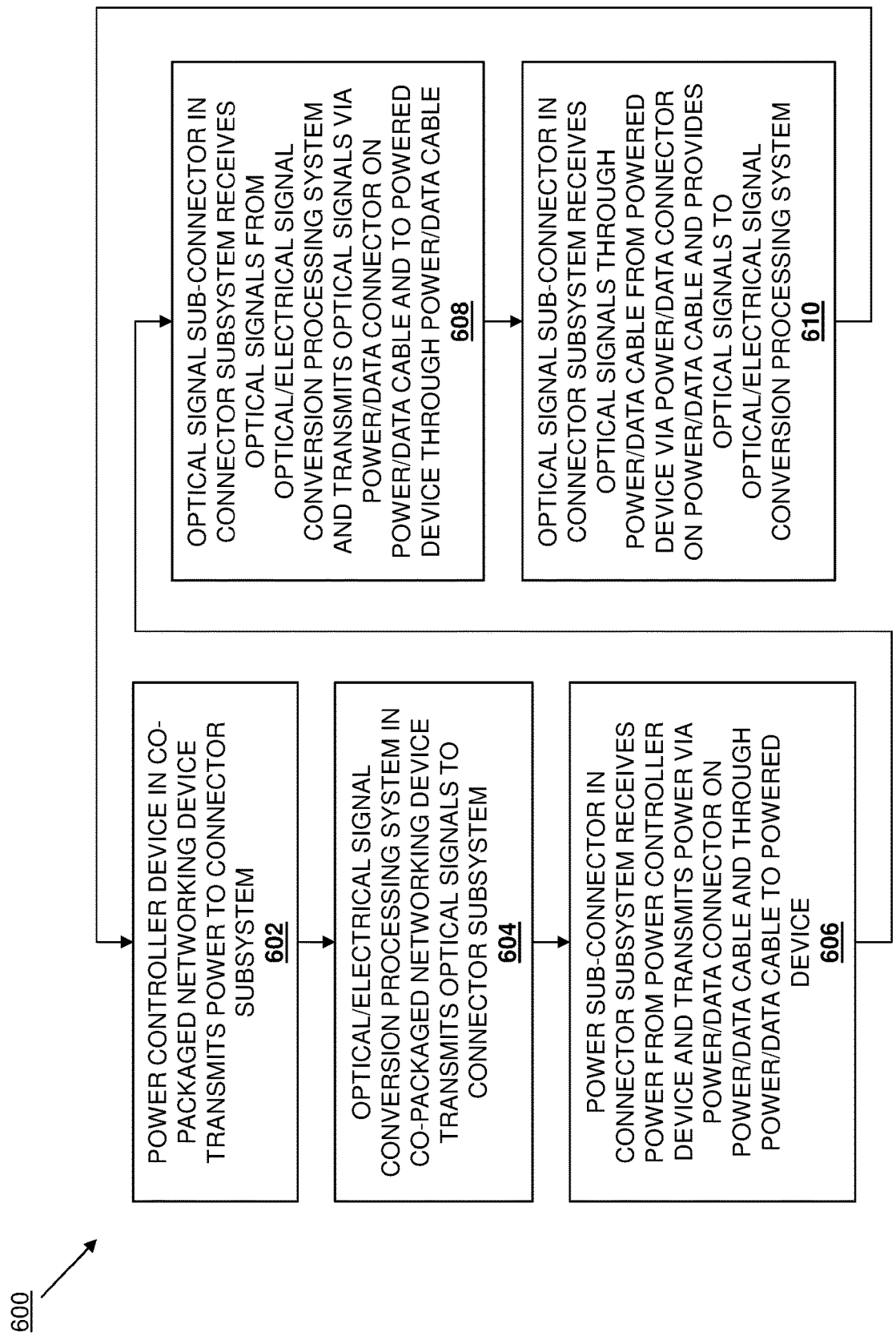
FIG. 6 is a flow chart illustrating an embodiment of a method for transmitting power and data via a co-packaged networking device.

Referring now to FIG. 6, an embodiment of a method 600 for transmitting power and data via a co-packaged networking device is illustrated. As discussed below, the systems and methods of the present disclosure provide a co-packaged networking device that is configured to transmit optical signals to a powered device without the need for a transceiver device, along with power, via a single power/data cable. For example, the powering co-packaged networking system of the present disclosure may include a powering co-packaged networking device coupled via a power/data cable to a powered device. The powering co-packaged networking device includes a connector subsystem coupled to a power controller device and an optical/electrical signal conversion processing system that converts between optical signals and electrical signals. The connector subsystem is connected to the powered device via a power/data connector on the power/data cable, and includes an optical signal sub-connector that receives optical signals from the optical/electrical signal conversion processing system and transmits the optical signals via the power/data connector on the power/data cable and through the power/data cable to the powered device, and a power sub-connector that receives power from the power controller device and transmits the power via the power/data connector on the power/data cable and through the power/data cable to the powered device. As such, the co-packaged networking device of the present disclosure eliminates the need for transceiver devices in the transmission of optical signals to increase data transmission speeds and improve signal integrity, while also providing power via the same power/data cable that transmits those optical signals, reducing the amount of cabling needed for the powered device.

Figure 7A:
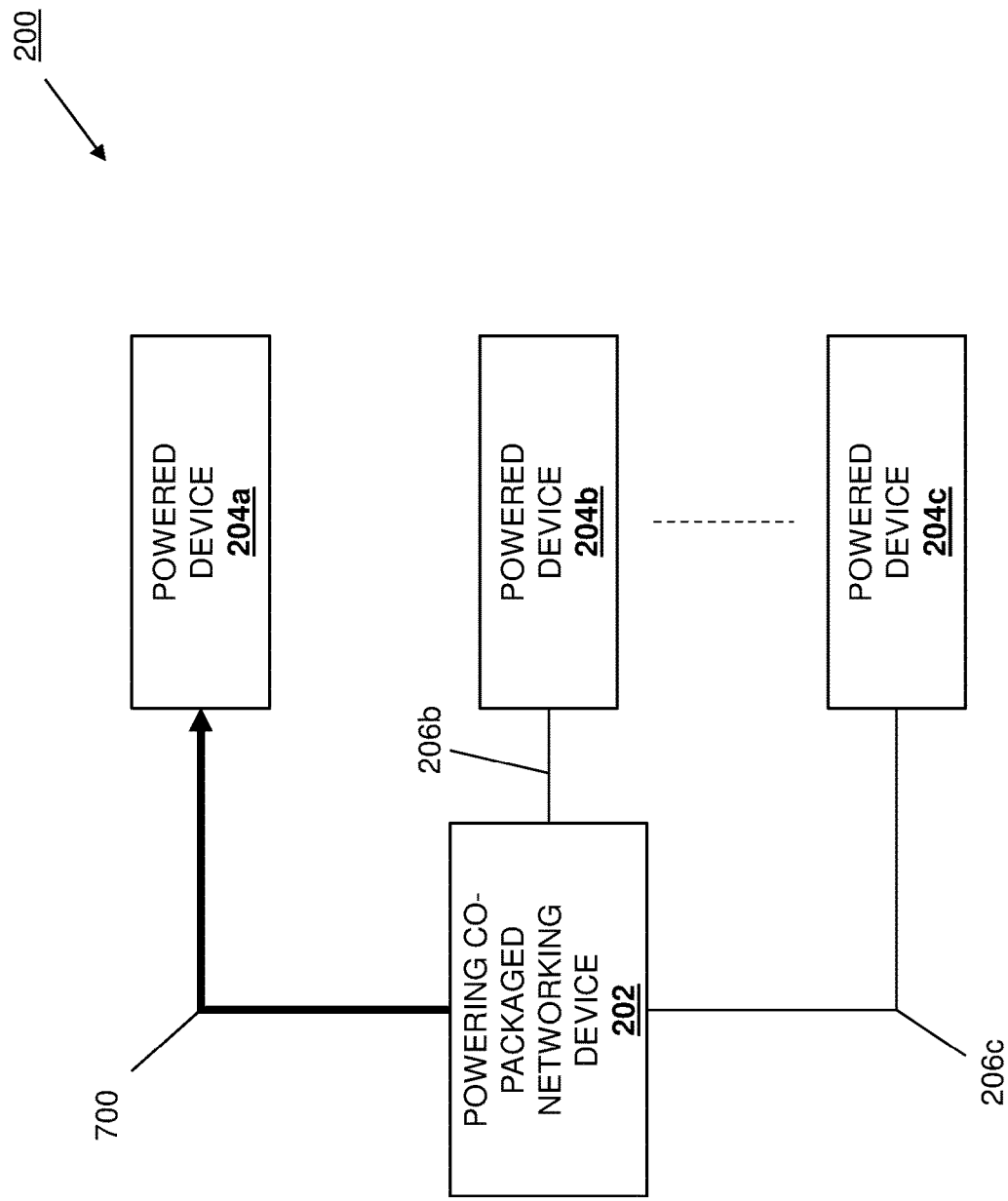
FIG. 7A is a schematic view illustrating an embodiment of the operation of the networked system of FIG. 2 during the method of FIG. 6.

The method 600 begins at block 602 where a power controller device in a co-packaged networking device transmits power to a connector subsystem. With reference to FIG. 7A, in an embodiment of block 602, the powering co-packaged networking device 202 may perform power/data transmission operations 700 that, in the illustrated embodiment, includes transmitting power via the power/data cable 206a to the powered device 204a. While the powering co-packaged networking device 202 is only discussed herein as transmitting power to the powered device 204a in the examples below, one of skill in the art in possession of the present disclosure will recognize that the powering co-packaged networking device 202 may perform similar power/data transmission operations to transmit power via the power/data cables 206b and up to 206c to the powered device 204b and up to 204c, respectively, while remaining within the scope of the present disclosure as well.

As will be appreciated by one of skill in the art in possession of the present disclosure, prior to the power/data transmission operations 700, the powered device 204a/300 may have been connected to the powering co-packaged networking device 202/400 via the power/data cable 206a/500 by connecting the first power/data connector 504 on the power/data cable 206a/500 to the connector subsystem 406a on the powering co-packaged networking device 202/400, and connecting the second power/data connector 506 on the power/data cable 206a/500 to the connector subsystem 306a on the powered device 204a/300. With reference to FIGS. 5A, 5B, and 5C, the connection of the first power/data connector 504 on the power/data cable 206a/500 to the connector subsystem 406a on the powering co-packaged networking device 202/400 may include engaging the first power/data connector 504 with the connector subsystem 406a such that the data sub-connector 504a on the first power/data connector 504 engages the data sub-connector 408 on the connector subsystem 406a (e.g., engaging male and female MPO connectors), and such that the power sub-connector 504b on the first power/data connector 504 engages the power sub-connector 410 on the connector subsystem 406a (e.g., engaging power pins with power sockets). As will be appreciated by one of skill in the art in possession of the present disclosure, the connection of the first power/data connector 504 on the power/data cable 206a/500 to the connector subsystem 406a on the powering co-packaged networking device 202/400 may include the engagement of securing features on the first power/data connector 504 and the connector subsystem 406a in order to secure the engagement of the data sub-connector 504a and power sub-connector 506b on the first power/data connector 504 with the data sub-connector 408 and power sub-connector 410 on the connector subsystem 406a, respectively.

Similarly, the connection of the second power/data connector 506 on the power/data cable 206a/500 to the connector subsystem 306a on the powered device 204a/300 may include engaging the second power/data connector 506 with the connector subsystem 306a such that the data sub-connector 504a on the second power/data connector 506 engages the data sub-connector 308 on the connector subsystem 306a (e.g., engaging male and female MPO connectors), and such that the power sub-connector 504b on the second power/data connector 506 engages the power sub-connector 310 on the connector subsystem 306a (e.g., engaging power pins with power sockets). As will be appreciated by one of skill in the art in possession of the present disclosure, the connection of the second power/data connector 506 on the power/data cable 206a/500 to the connector subsystem 306a on the powered device 204a/300 may include the engagement of securing features on the second power/data connector 506 and the connector subsystem 306a in order to secure the engagement of the data sub-connector 504a and power sub-connector 504b on the second power/data connector 506 with the data sub-connector 308 and power sub-connector 310 on the connector subsystem 306a.

Furthermore, following the connection of the powered device 204a/300 to the powering co-packaged networking device 202/400, the power controller device 414 may have performed power classification operations to determine an amount of power to supply to the powered device 204a/300 via the connector subsystem 406a at block 602, and one of skill in the art in possession of the present disclosure will recognize that a variety of power classification techniques (e.g., based on a resistance detected via the connector subsystem 406a, based on power negotiation communications with the powered device 204a/300, etc.) may be performed to determine the amount of power to provide to the powered device 204a/300 at block 602. For example, current powered devices may be configured to consume different power amounts/ranges up to 99 watts, although future higher power amounts are envisioned as falling within the scope of the present disclosure as well.

Figure 7B:
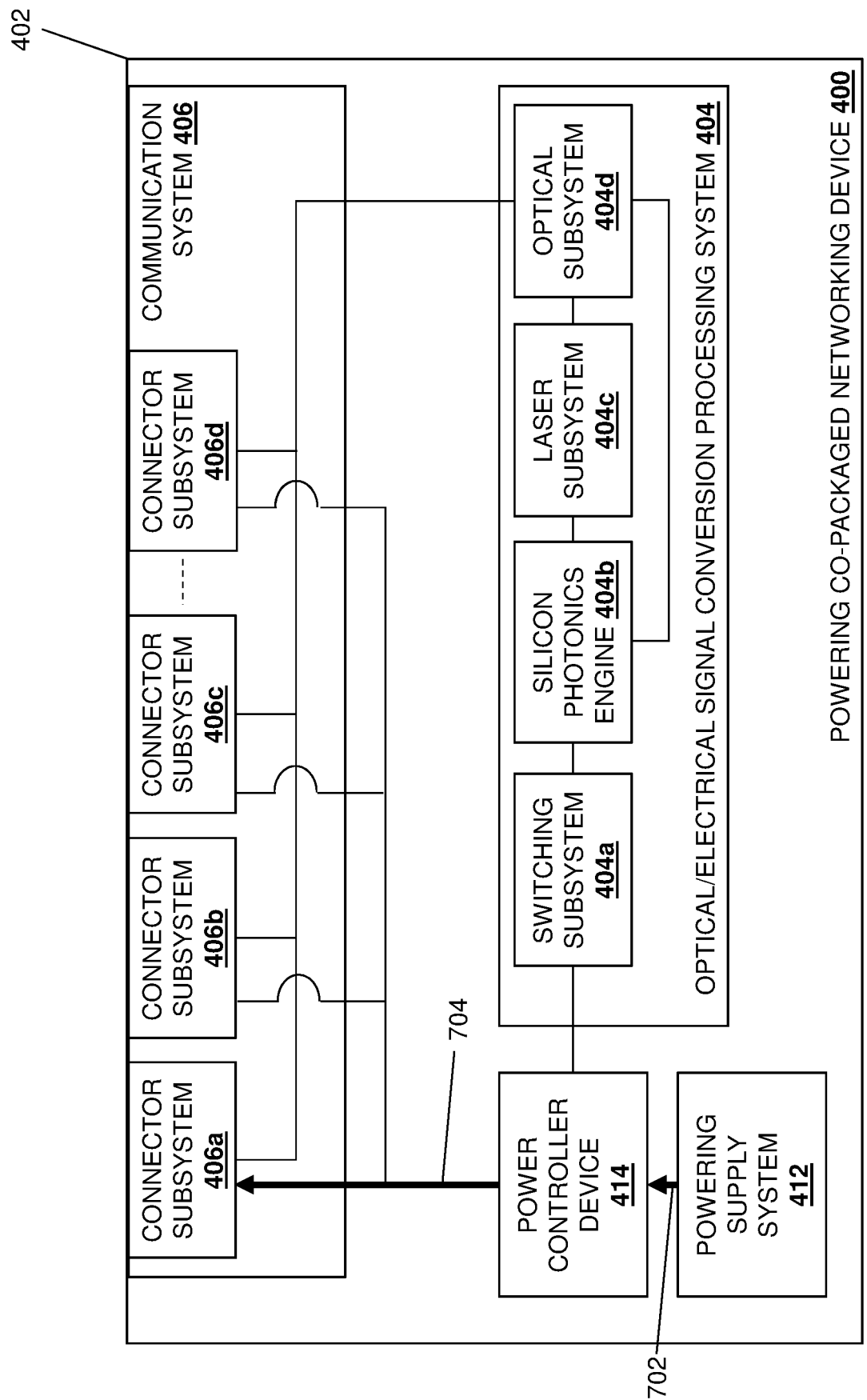
FIG. 7B is a schematic view illustrating an embodiment of the operation of the powering co-packaged networking device of FIGS. 4A and 4B during the method of FIG. 6.

As such, with reference to FIG. 7B, at block 602 the powering supply system 412 in the powering co-packaged networking device 202/400 may perform power supply operations 702 that include transmitting power received from a power source (not illustrated, but which may be provided by an AC wall outlet or other power source known in the art, and which may be subject to power conversion and/or other power operations by the powering supply system 412) to the power controller device 414 in the powering co-packaged networking device 202/400. The power controller device 414 may then perform power transmission operations 704 in order to transmit an amount of the power received from the power supply system 412 to the connector subsystem 406a (e.g., based on the power classification operations performed for the powered device 204a/300 as discussed above).

Figure 7C:
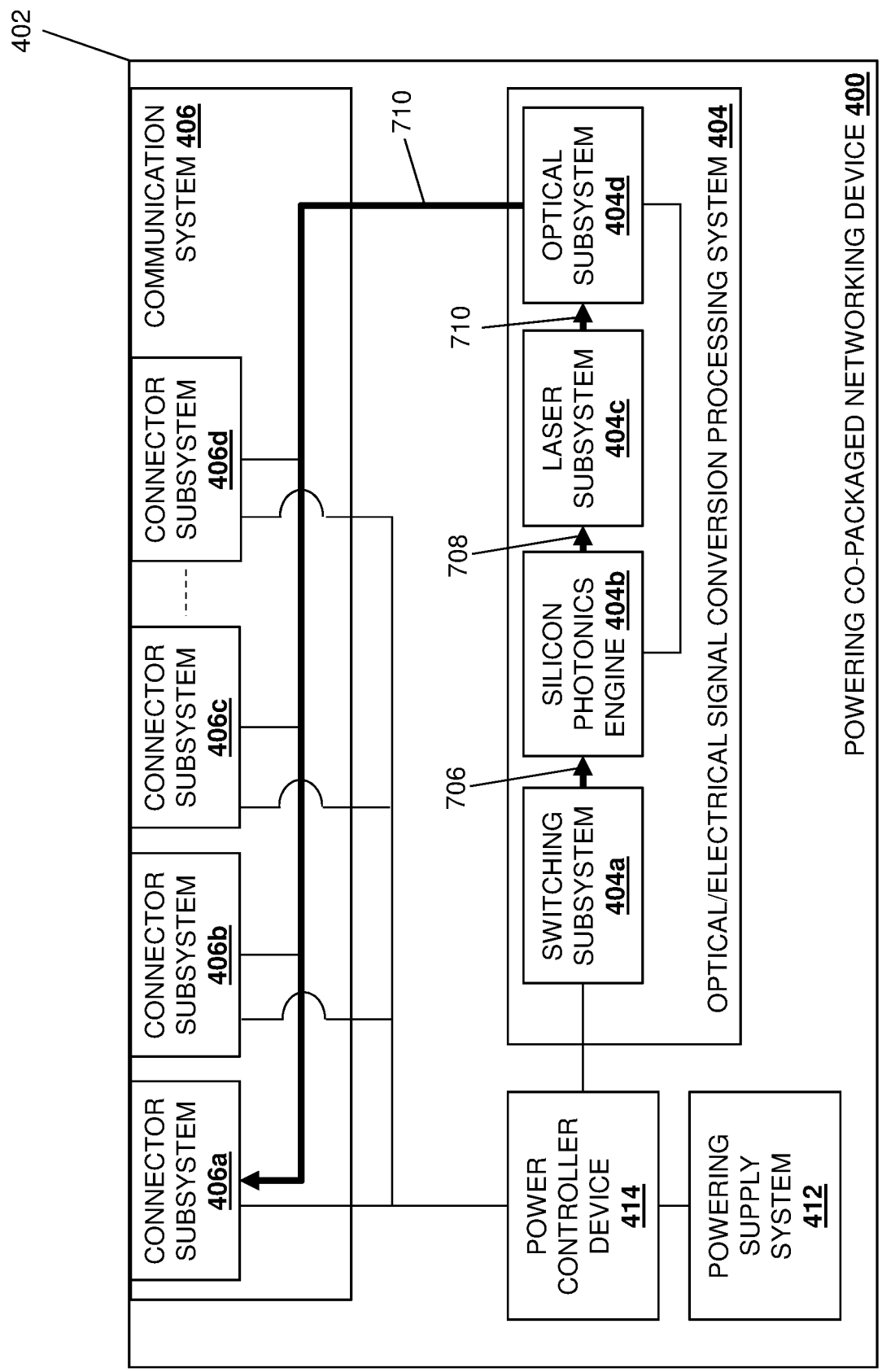
FIG. 7C is a schematic view illustrating an embodiment of the operation of the powering co-packaged networking device of FIGS. 4A and 4B during the method of FIG. 6.

The method 600 then proceeds to block 604 where an optical/electrical signal conversion processing system in the co-packaged networking device transmits optical signals to the connector subsystem. With reference to FIG. 7C, in an embodiment of block 604 and as part of power/data transmission operations 700 discussed above, the switching subsystem 404a in the optical/electrical signal conversion processing system 404 included in the powering co-packaged networking device 400 may perform electrical signal transmission operations 706 that include transmitting electrical signals to the silicon photonics engine 404b. In some examples, the switching subsystem 404a may generate the electrical signals that are transmitted to the silicon photonics engine 404b at block 604, while in other examples the switching subsystem 404a may receive (e.g., via a network) and forward the electrical signals that are transmitted to the silicon photonics engine 404b at block 604. However, while a few specific examples of electrical signals are provided, one of skill in the art in possession of the present disclosure will appreciate that the electrical signals may be provided by the switching subsystem 404a at block 604 in a variety of manners known in the art.

With continued reference to FIG. 7C, in an embodiment of block 604 and as part of power/data transmission operations 700 discussed above, the silicon photonics engine 404b in the optical/electrical signal conversion processing system 404 included in the powering co-packaged networking device 400 may receive the electrical signals from the switching subsystem 404a and, in response, perform electrical/optical conversion operations 708 that include converting those electrical signals to optical signals and providing the optical signals to the laser subsystem 404c. As will be appreciated by one of skill in the art in possession of the present disclosure, the silicon photonics engine 404b may perform a variety of silicon photonics functionality in order to convert the electrical signals to optical signals at block 604. Furthermore, while silicon photonic electrical/optical conversion techniques are described, one of skill in the art in possession of the present disclosure will recognize that other electrical/optical conversion techniques will fall within the scope of the present disclosure as well.

With continued reference to FIG. 7C, in an embodiment of block 604 and as part of power/data transmission operations 700 discussed above, the laser subsystem 404c in the optical/electrical signal conversion processing system 404 included in the powering co-packaged networking device 400 may receive the optical signals from the silicon photonics engine 404b and, in response, perform optical signal transmission operations 710 that include generating optical signal pulses (e.g., laser pulses) that transmit the optical signals received from the silicon photonics engine 404b via the optical subsystem 404d to the connector subsystem 406a. As will be appreciated by one of skill in the art in possession of the present disclosure, the optical subsystem 404d and the couplings between the optical subsystem 404d and the connector subsystem 406a may include a variety of optical mediums (e.g., fiber optic cabling, fiber optic couplings, etc.) that allow the transmission of the optical signals converted from the electrical signals by the silicon photonics engine 404b and provided via the optical signal pulses by the laser subsystem 404c at block 604.

Figure 7D:
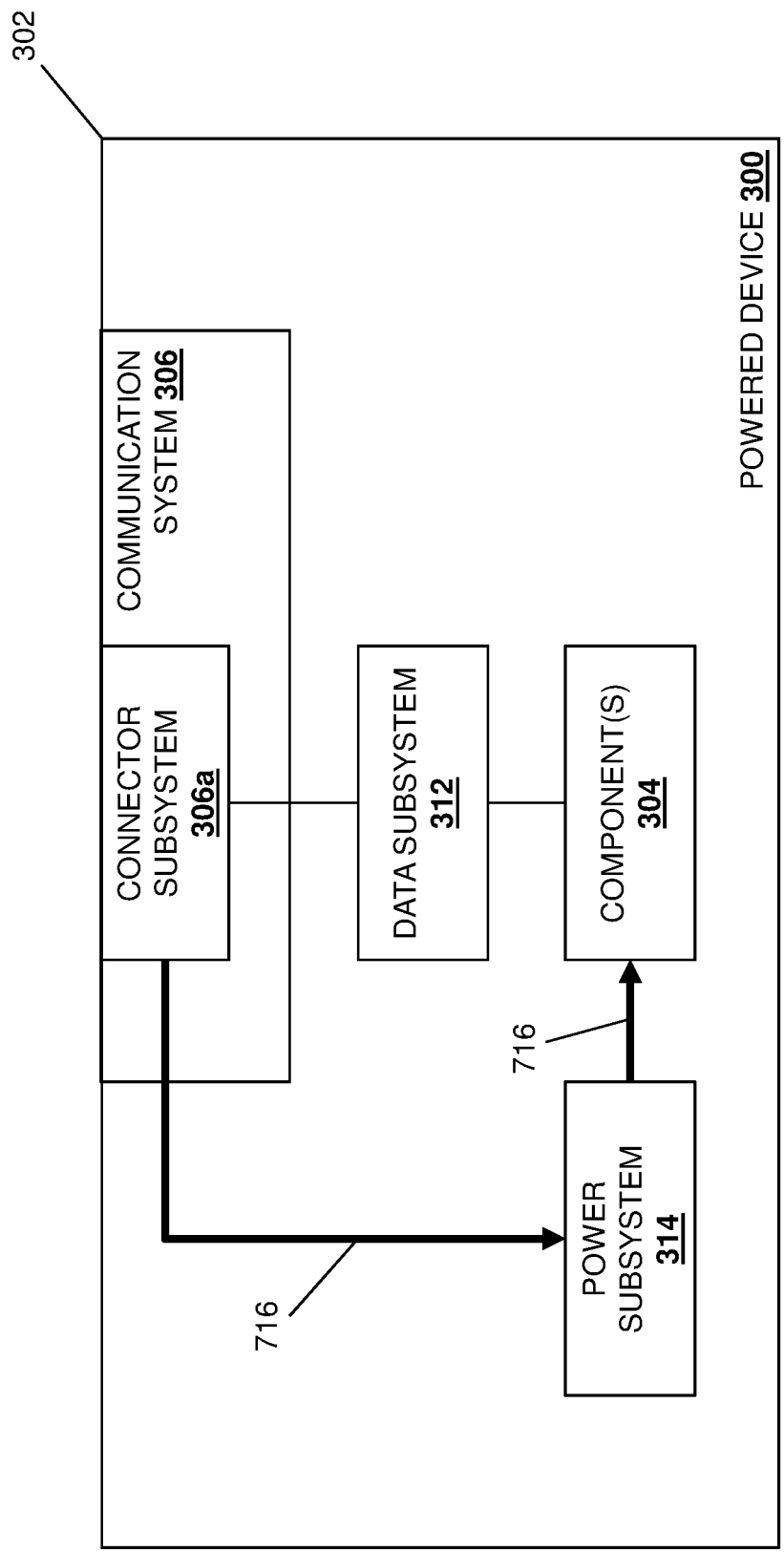
FIG. 7D is a schematic view illustrating an embodiment of the operation of the powered device of FIGS. 3A and 3B during the method of FIG. 6.

The method 600 then proceeds to block 606 where a power sub-connector in the connector subsystem receives the power from the power controller device and transmits the power via a power/data connector on a power/data cable and through the power/data cable to a powered device. In an embodiment, at block 606, the power sub-connector 410 on the connector subsystem 406a included on the powering co-packaged networking device 202/400 may receive the power transmitted by the power controller device 414, and provide that power via the power sub-connector 504b on the first power/data connector 504 included on the power/data cable 206a/500 and to the power conductive medium 502d in the cabling base 502. That power will then be transmitted along the length of the cabling base 502 via the power conductive medium 502d and to the power sub-connector 504b on the second power/data connector 506 included on the power/data cable 206a/500, with the power sub-connector 504b on the second power/data connector 506 providing that power to the power sub-connector 310 on the connector subsystem 306a on the powered device 204a/300. As such, with reference to FIG. 7D, at block 606 the power sub-connector 310 on the connector subsystem 306a on the powered device 204a/300 may perform power transmission operations 716 to transmit the power received from the power/data cable 206a/500 via the power subsystem 310 to the component(s) 304. Thus, power may be transmitted by the powering co-packaged networking device 202/400 to the powered device 204a/300 via the power/data cable 206a/500, and may be used to power one or more components 300 in the powered device 204a/300.

The method 600 then proceeds to block 608 where an optical signal sub-connector in the connector subsystem receives optical signals from the optical/electrical signal conversion processing system and transmits the optical signals via the power/data connector on the power/data cable and through the power/data cable to the powered device. In an embodiment, at block 608, the data sub-connector 408 on the connector subsystem 406a included on the powering co-packaged networking device 202/400 may receive the optical signals transmitted by the optical/electrical signal conversion processing system 404, and provide those optical signals via the data sub-connector 504a on the first power/data connector 504 included on the power/data cable 206a/500 and to the fiber optic medium 502c in the cabling base 502. Those optical signals will then be transmitted along the length of the cabling base 502 via the fiber optic medium 502c and to the data sub-connector 504a on the second power/data connector 506 included on the power/data cable 206a/500, with the data sub-connector 504a on the second power/data connector 506 providing those optical signals to the data sub-connector 308 on the connector subsystem 306a on the powered device 204a/300.

Figure 7E:
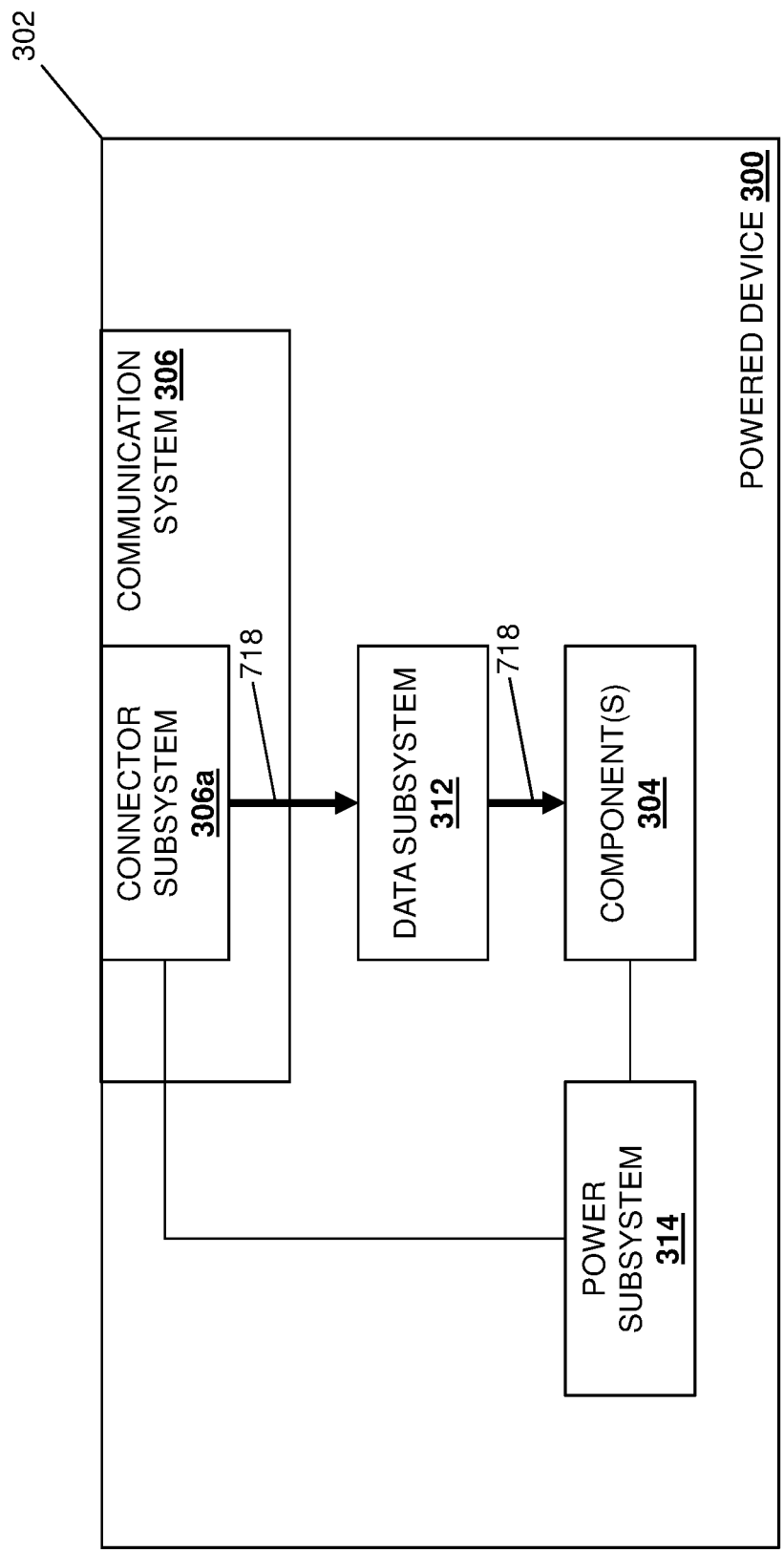
FIG. 7E is a schematic view illustrating an embodiment of the operation of the powered device of FIGS. 3A and 3B during the method of FIG. 6.

As such, with reference to FIG. 7E, at block 606 the data sub-connector 308 on the connector subsystem 306a on the powered device 204a/300 may perform optical signal transmission operations 718 to transmit the optical signals received from the power/data cable 206a/500 via the data subsystem 310 to the component(s) 304. Thus, optical signals may be transmitted by the powering co-packaged networking device 202/400 to the powered device 204a/300 via the power/data cable 206a/500, and may be provided to one or more components 300 in the powered device 204a/300. While not illustrated or described herein, one of skill in the art in possession of the present disclosure will appreciated that some components in a powered device may be configured to utilize electrical signals and, as such, in some embodiments the data subsystem 312 may include optical/electrical data conversion subsystems that are configured to convert the optical signals received via the data sub-connector 308 on the connector subsystem 306a to electrical signals, and provide those electrical signals to the component(s) 304.

Figure 8A:
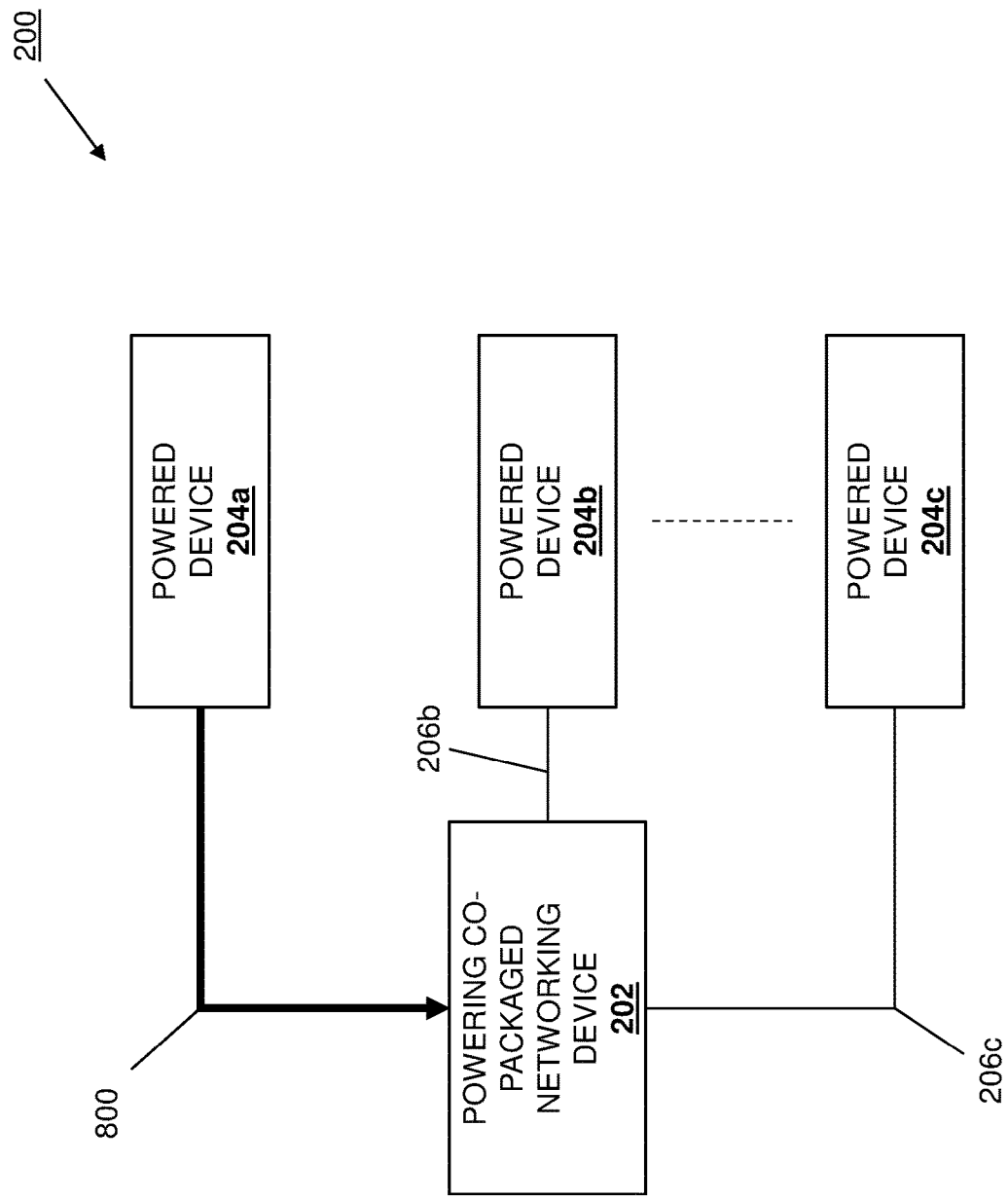
FIG. 8A is a schematic view illustrating an embodiment of the operation of the networked system of FIG. 2 during the method of FIG. 6.

The method 600 then proceeds to block 610 where the optical signal sub-connector in the connector subsystem receives optical signals through the power/data cable from the powered device via the power/data connector on the power/data cable and provides the optical signals to the optical/electrical signal conversation processing system. With reference to FIG. 8A, in an embodiment of block 610, the powered device 204a may perform data transmission operations 800 that, in the illustrated embodiment, includes transmitting optical signals via the power/data cable 206a to the powering co-packaged networking device 202. While only the powered device 204a is discussed herein as transmitting optical signals to the powering co-packaged networking device 202 in the examples below, one of skill in the art in possession of the present disclosure will recognize that the powered device 204b and up to 204c may perform similar data transmission operations to transmit optical signals via the power/data cables 206b and up to 206c, respectively, to the powering co-packaged networking device 202 while remaining within the scope of the present disclosure as well.

Figure 8B:
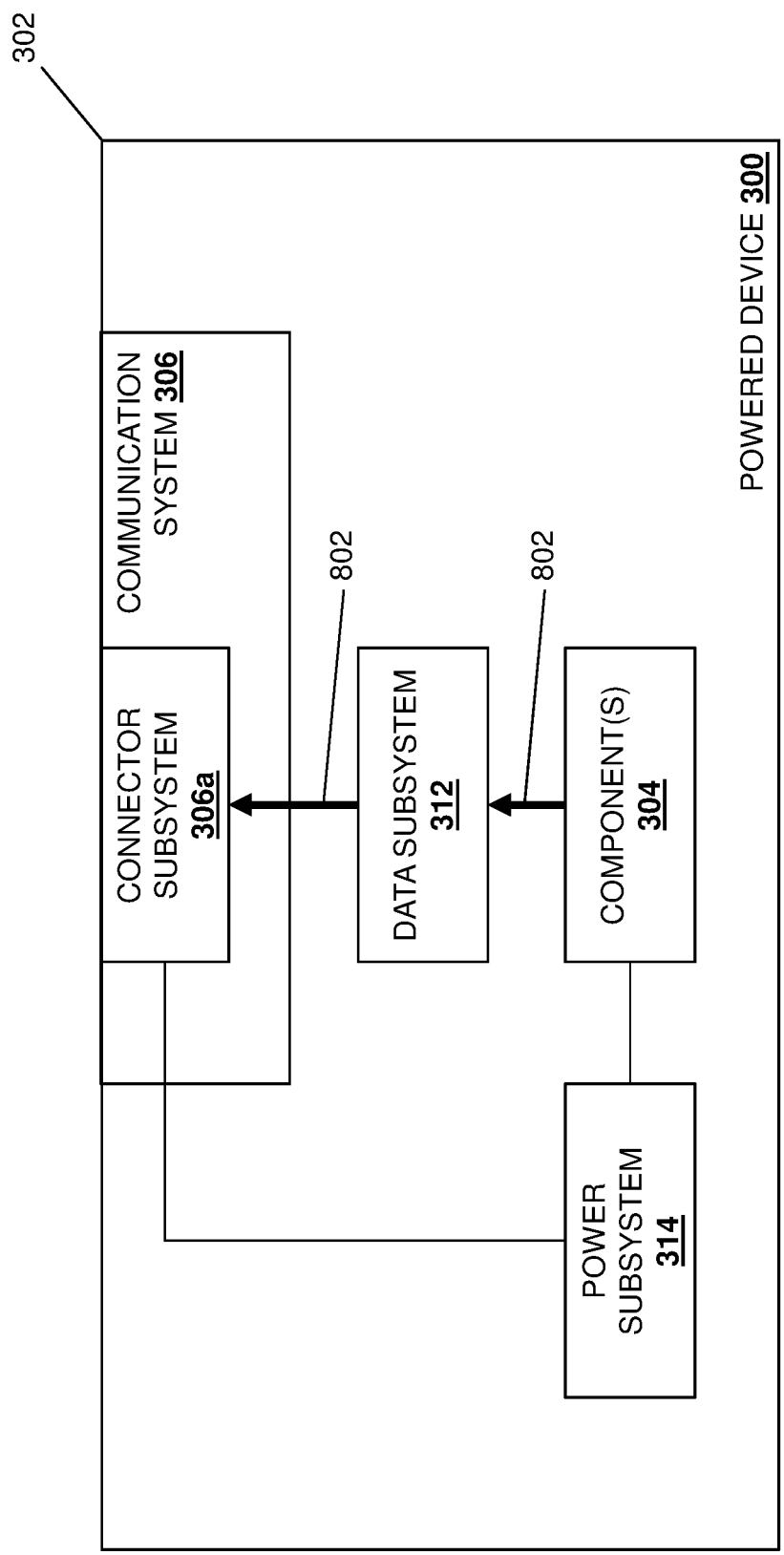
FIG. 8B is a schematic view illustrating an embodiment of the operation of the powered device of FIGS. 3A and 3B during the method of FIG. 6.

For example, with reference to FIG. 8B, at block 610 and as part of the data transmission operations 800 discussed above, the component(s) 304 included in the powered device 204a/300 may perform optical signal transmission operations 802 to transmit optical signals via the data subsystem 310 to the connector subsystem 306a in the communication system 306 included in the powered device 204a/300. While not illustrated or described herein, one of skill in the art in possession of the present disclosure will appreciated that some components in a powered device may be configured to utilize electrical signals and, as such, in some embodiments the data subsystem 312 may include optical/electrical data conversion subsystems that are configured to convert the electrical signals received from the component(s) 304 to optical signals, and provide those optical signals to the connector subsystem 306a.

In an embodiment, at block 610 and as part of the data transmission operations 800 discussed above, the data sub-connector 308 on the connector subsystem 306a included on the powered device 204a/300 may receive the optical signals transmitted by the component(s) 304, and provide those optical signals via the data sub-connector 504a on the second power/data connector 506 included on the power/data cable 206a/500 and to the fiber optic medium 502c in the cabling base 502. Those optical signals will then be transmitted along the length of the cabling base 502 via the fiber optic medium 502c and to the data sub-connector 504a on the first power/data connector 504 included on the power/data cable 206a/500, with the data sub-connector 504a on the first power/data connector 504 providing those optical signals to the data sub-connector 408 on the connector subsystem 406a on the powering co-packaged networking device 202/400.

Figure 8C:
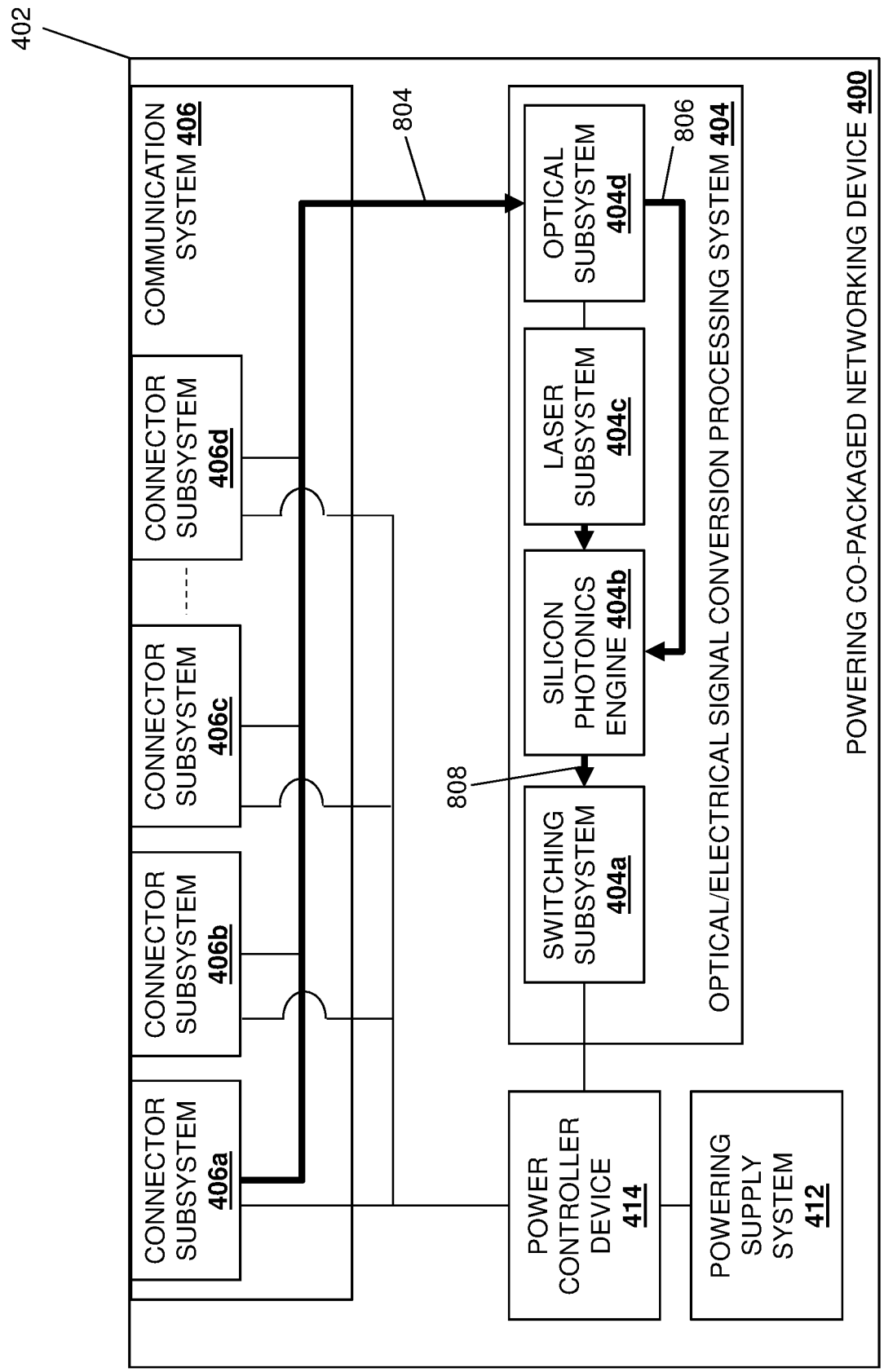
FIG. 8C is a schematic view illustrating an embodiment of the operation of the powering co-packaged networking device of FIGS. 4A and 4B during the method of FIG. 6.

With reference to FIG. 8C, in an embodiment of block 610 and as part of data transmission operations 800 discussed above, the data sub-connector 408 on the connector subsystem 406a on the powering co-packaged networking device 202/400 may receive the optical signals from power/data cable 206a/500 and, in response, perform optical signal transmission operations 804 that include transmitting those optical signals to the optical subsystem 404d. As discussed above, the optical subsystem 404d and the couplings between the optical subsystem 404d and the connector subsystem 406a may include a variety of optical mediums (e.g., fiber optic cabling, fiber optic couplings, etc.) that allow the transmission of the optical signals received from the power/data cable 206a/500 at block 610.

With continued reference to FIG. 8C, in an embodiment of block 610 and as part of data transmission operations 800 discussed above, the optical subsystem 404d in the optical/electrical signal conversion processing system 404 may perform optical signal transmission operations 806 to provide the optical signals received from the connector subsystem 406a to the silicon photonics engine 404b. The silicon photonics engine 404b in the optical/electrical signal conversion processing system 404 included in the powering co-packaged networking device 400 may then receive the optical signals from the optical subsystem 404d and, in response, perform optical/electrical conversion operations 808 that include converting those optical signals to electrical signals and providing the electrical signals to the switching subsystem 404a. However, while silicon photonic optical/electrical conversion techniques are described, one of skill in the art in possession of the present disclosure will recognize that other optical/electrical conversion techniques will fall within the scope of the present disclosure as well. As will be appreciated by one of skill in the art in possession of the present disclosure, the switching subsystem 404a in the optical/electrical signal conversion processing system 404 may then receive those electrical signals and, in response, perform a variety of switching functionality known in the art at block 604. As such, optical signals may be transmitted by the powered device 204a/300 to the powering co-packaged networking device 202/400 via the power/data cable 206a/500. The method 600 then returns to block 602, with the method 600 looping such that the powering co-packaged networking device 202 transmits both optical signals and power via the power/data cable 206a to the powered device 204a, and the powered device 204a transmits optical signals via the power/data cable 206a to the powering co-packaged networking device 202.

Thus, systems and methods have been described that provide a co-packaged networking device that is configured to transmit optical signals to a powered device without the need for a transceiver device, along with power, via a single power/data cable. For example, the powering co-packaged networking system of the present disclosure may include a powering co-packaged networking device coupled via a power/data cable to a powered device. The powering co-packaged networking device includes a connector subsystem coupled to a power controller device and an optical/electrical signal conversion processing system that converts between optical signals and electrical signals. The connector subsystem is connected to the powered device via a power/data connector on the power/data cable, and includes an optical signal sub-connector that receives optical signals from the optical/electrical signal conversion processing system and transmits the optical signals via the power/data connector on the power/data cable and through the power/data cable to the powered device, and a power sub-connector that receives power from the power controller device and transmits the power via the power/data connector on the power/data cable and through the power/data cable to the powered device. As such, the co-packaged networking device of the present disclosure eliminates the need for transceiver devices in the transmission of optical signals to increase data transmission speeds and improve signal integrity, while also providing power via the same power/data cable that transmits those optical signals, reducing the amount of cabling needed for the powered device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A powering co-packaged networking system, comprising:
   a powered device;
   a power/data cable connected to the powered device; and
   a powering co-packaged networking device including:
      a networking processor including an integrated optical/electrical signal conversion processing system that is configured to enable the powering co-packaged networking device to convert between optical signals and electrical signals without the use of a connectable transceiver device;
      a power controller device; and
      a connector subsystem that is coupled to the integrated optical/electrical signal conversion processing system and the power controller device, wherein the connector subsystem is connected to the powered device via a power/data connector on the power/data cable and includes:
         an optical signal Multi-fiber Push-On (MPO) sub-connector that is configured to receive first optical signals from the integrated optical/electrical signal conversion processing system and transmit the first optical signals via a direct connection to the power/data connector on the power/data cable and through the power/data cable to the powered device; and
         a power pin sub-connector that is configured to receive power from the power controller device and transmit the power via the power/data connector on the power/data cable and through the power/data cable to the powered device.

2. The system of claim 1, wherein the optical signal MPO sub-connector is configured to receive second optical signals through the power/data cable from the powered device via the direct connection to the power/data connector on the power/data cable, and provide those second optical signals to the integrated optical/electrical signal conversion processing system in the networking processor.

3. The system of claim 1, wherein the integrated optical/electrical signal conversion processing system includes an integrated silicon photonics engine that is configured to convert between electrical signals and optical signals, an integrated laser subsystem that is configured to generate optical pulses from the optical signals generated by the integrated silicon photonics engine, and an integrated optical subsystem that is configured to transmit optical pulses generated by the integrated laser subsystem via the optical signal MPO sub-connector, and provide optical signals received via the optical signal MPO sub-connector directly to the integrated silicon photonics engine.

4. The system of claim 1, wherein the connection of the connector subsystem to the power/data connector on the power/data cable aligns the optical signal MPO sub-connector on the connector subsystem with a fiber optic coupling included on the power/data connector, and aligns the power sub-connector on the connector subsystem with a power coupling included on the power/data connector.

5. The system of claim 4, wherein the optical signal MPO sub-connector transmitting the first optical signals via the direct connection to the power/data connector on the power/data cable and through the power/data cable includes transmitting the first optical signals via the fiber optic coupling included on the power/data connector and through a fiber optic medium included in the power/data cable.

6. The system of claim 4, wherein the power pin sub-connector transmitting the power via the power/data connector on the power/data cable and through the power/data cable includes transmitting the power via the power coupling included on the power/data connector and through a power conductive medium included in the power/data cable.

7. An Information Handling System (IHS), comprising:
a chassis;
a power controller device that is included in the chassis;
a networking processor including an integrated optical/electrical signal conversion processing system that is configured to enable the IHS to convert between optical signals and electrical signals without the use of a connectable transceiver device; and
a connector subsystem that is coupled to the integrated optical/electrical signal conversion processing system and the power controller device, wherein the connector subsystem is configured to be connected to a powered device via a power/data connector on a power/data cable and includes:
an optical signal Multi-fiber Push-On (MPO) sub-connector that is configured to receive first optical signals from the integrated optical/electrical signal conversion processing system and transmit the first optical signals via a direct connection to the power/data connector on the power/data cable and through the power/data cable to the powered device; and
a power pin sub-connector that is configured to receive power from the power controller device and transmit the power via the power/data connector on the power/data cable and through the power/data cable to the powered device.

8. The IHS of claim 7, wherein the optical signal MPO sub-connector is configured to receive second optical signals through the power/data cable from the powered device via the direct connection to the power/data connector on the power/data cable, and provide those second optical signals to the integrated optical/electrical signal conversion processing system in the networking processor.

9. The IHS of claim 7, wherein the integrated optical/electrical signal conversion processing system includes an integrated silicon photonics engine that is configured to convert between electrical signals and optical signals, an integrated laser subsystem that is configured to generate optical pulses from the optical signals generated by the integrated silicon photonics engine, and an integrated optical subsystem that is configured to transmit optical pulses generated by the integrated laser subsystem via the optical signal MPO sub-connector, and provide optical signals received via the optical signal MPO sub-connector directly to the integrated silicon photonics engine.

10. The IHS of claim 7, wherein the connection of the connector subsystem to the power/data connector on the power/data cable aligns the optical signal MPO sub-connector on the connector subsystem with a fiber optic coupling included on the power/data connector, and aligns the power sub-connector on the connector subsystem with a power coupling included on the power/data connector.

11. The IHS of claim 10, wherein the optical signal MPO sub-connector transmitting the first optical signals via the direct connection to the power/data connector on the power/data cable and through the power/data cable includes transmitting the first optical signals via the fiber optic coupling included on the power/data connector and through a fiber optic medium included in the power/data cable.

12. The IHS of claim 10, wherein the power pin sub-connector transmitting the power via the power/data connector on the power/data cable and through the power/data cable includes transmitting the power via the power coupling included on the power/data connector and through a power conductive medium included in the power/data cable.

13. The IHS of claim 7, wherein the integrated optical/electrical signal conversion processing system includes:
an Ethernet switch chip that is configured to perform data processing operations.

14. A method for transmitting power and data via a co-packaged networking device, comprising:
transmitting, by a power controller device in a co-packaged networking device, powered received from a power supply system in the co-packaged networking device;
converting, by the co-packaged networking device using an integrated optical/electrical signal conversion processing system in a networking processor included in the co-packaged networking device and without the use of a connectable transceiver device, between optical signals and electrical signals;
receiving, by an optical signal sub-connector that is included in a connector subsystem in the co-packaged networking device, first optical signals from the integrated optical/electrical signal conversion processing system;
transmitting, by the optical signal Multi-fiber Push-On (MPO) sub-connector that is included in the connector subsystem in the co-packaged networking device, the first optical signals via a direct connection to a power/data connector on a power/data cable and through the power/data cable to a powered device;
receiving, by a power pin sub-connector that is included in the connector subsystem in the co-packaged networking device, the power transmitted by the power controller device; and
transmitting, by the power sub-connector that is included in the connector subsystem in the co-packaged networking device, the power via the power/data connector on the power/data cable and through the power/data cable to the powered device.

15. The method of claim 14, further comprising:
receiving, by the optical signal MPO sub-connector that is included in the connector subsystem in the co-packaged networking device, second optical signals through the power/data cable from the powered device via the direct connection to the power/data connector on the power/data cable; and
providing, by the optical signal MPO sub-connector that is included in the connector subsystem in the co-packaged networking device, the second optical signals to the integrated optical/electrical signal conversion processing system.

16. The method of claim 14, wherein the integrated optical/electrical signal conversion processing system includes an integrated silicon photonics engine that is configured to convert between electrical signals and optical signals, an integrated laser subsystem that is configured to generate optical pulses from the optical signals generated by the integrated silicon photonics engine, and an integrated optical subsystem that is configured to transmit optical pulses generated by the integrated laser subsystem via the optical signal MPO sub-connector, and provide optical signals received via the optical signal MPO sub-connector directly to the integrated silicon photonics engine.

17. The method of claim 14, further comprising:
connecting the connector subsystem to the power/data connector on the power/data cable to align the optical signal MPO sub-connector on the connector subsystem with a fiber optic coupling included on the power/data connector, and align the power sub-connector on the connector subsystem with a power coupling included on the power/data connector.

18. The method of claim 17, wherein the optical signal MPO sub-connector transmitting the first optical signals via the direction connection to the power/data connector on the power/data cable and through the power/data cable includes transmitting the first optical signals via the fiber optic coupling included on the power/data connector and through a fiber optic medium included in the power/data cable.

19. The method of claim 17, wherein the power pin sub-connector transmitting the power via the power/data connector on the power/data cable and through the power/data cable includes transmitting the power via the power coupling included on the power/data connector and through a power conductive medium included in the power/data cable.

20. The method of claim 14, further comprising:
performing, by an Ethernet switch chip included in the integrated optical/electrical signal conversion processing system, data processing operations.

* * * * *